United States Patent
Dexter

[15] 3,663,029
[45] May 16, 1972

[54] CHUCK JAW LOCKING MECHANISM

[72] Inventor: William R. Dexter, Royal Oak, Mich.

[73] Assignee: Verstand Engineering, Inc., Madison Heights, Mich.

[22] Filed: Apr. 16, 1970

[21] Appl. No.: 29,112

[52] U.S. Cl..............................279/119, 279/110, 279/123
[51] Int. Cl.......................................................B23b 31/16
[58] Field of Search.................279/110, 117, 118, 119, 120, 279/121, 123, 28, 1 SG

[56] References Cited

UNITED STATES PATENTS

| | | | |
|---|---|---|---|
| 2,832,604 | 4/1958 | LeBrusque | 279/119 |
| 2,473,935 | 6/1949 | Ashton | 279/123 |
| 3,370,859 | 2/1968 | Benjamin et al. | 279/119 |

FOREIGN PATENTS OR APPLICATIONS

| | | | |
|---|---|---|---|
| 609,057 | 1/1935 | Germany | 279/119 |

Primary Examiner—Francis S. Husar
Assistant Examiner—James F. Coan
Attorney—Whittemore, Hulbert & Belknap

[57] ABSTRACT

A rotating chuck having circumferentially spaced jaws and pivoted clamping levers for moving the jaws radially inwardly to clamp a workpiece. A wedge is associated with each jaw to hold the same against outward movement due to centrifugal force. Springs are provided to urge the wedges in a wedging direction. The levers release the wedges when retracting the jaws.

1 Claim, 4 Drawing Figures

INVENTOR
WILLIAM R. DEXTER

INVENTOR
WILLIAM R. DEXTER
BY
Whittemore, Hulbert & Belknap
ATTORNEYS

CHUCK JAW LOCKING MECHANISM

SUMMARY OF THE INVENTION

One object of this invention is to provide a rotating chuck having one or more jaws movable radially inwardly to clamp a workpiece, with means for holding the jaws against outward movement due to centrifugal force.

Another object is to provide a rotating chuck having wedge means for preventing radially outward movement of the chuck jaws.

Another object is to provide a rotating chuck having clamping means movable in one direction to shift the jaws inwardly to clamping position, and movable in the opposite direction to unclamp the jaws and simultaneously to release the wedge means.

Another object is to provide a rotating chuck having a wedge associated with each jaw for holding the same against radially outward movement, and a pivoted lever operative to release the wedge when moved to retract the jaw.

Another object is to provide spring-urged wedges for the jaws in the form of pivoted members.

Another object is to provide a rotating chuck having a chuck body, circumferentially spaced jaws radially movably mounted on the body to clamp a workpiece upon radially inward movement thereof, pivoted clamping levers for the jaws operable to move them radially inwardly and outwardly, pivoted wedges for the jaws provided to hold the jaws against radially outward movement but released by the pivoted levers when the levers retract the jaws, and springs for normally urging the wedges in a wedging direction.

Other objects and features of the invention will become apparent as the description proceeds, especially when taken in conjunction with the accompanying drawings, wherein.

Figure 1:
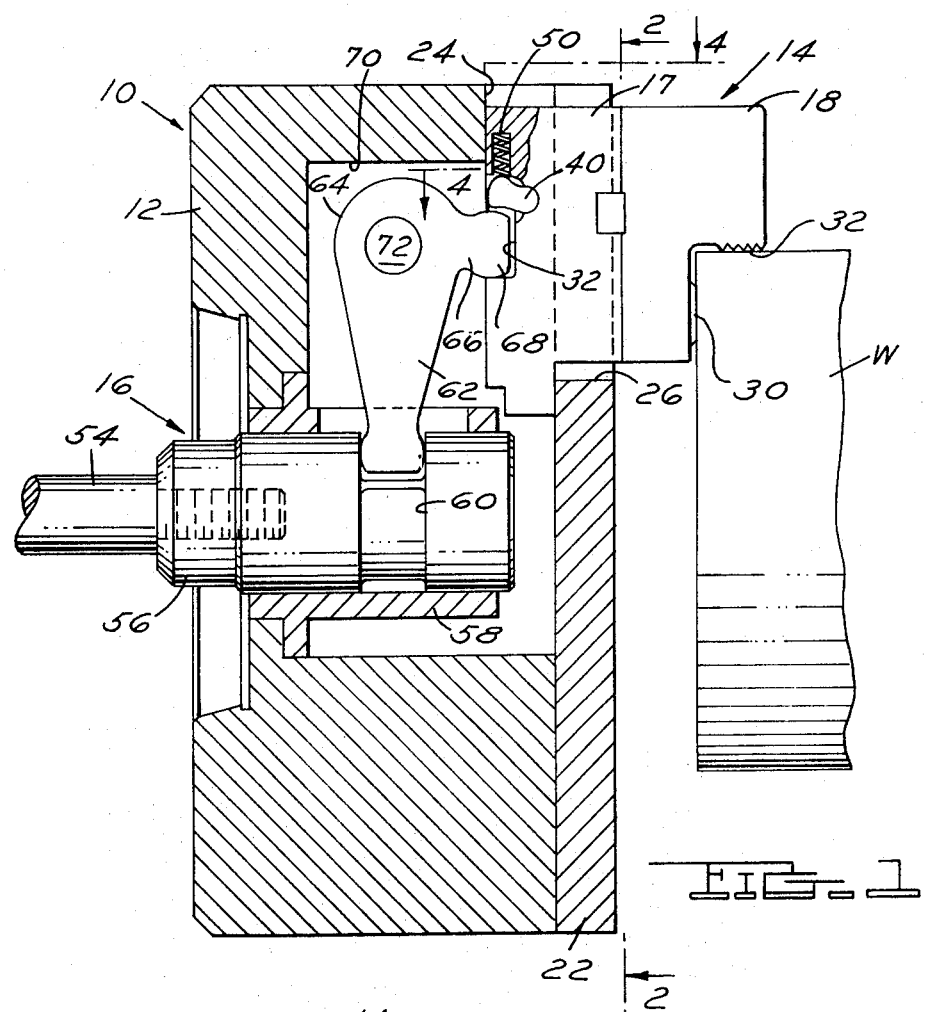
FIG. 1 is a side elevational view with parts in section and with two of the clamping jaws removed, of a rotating chuck constructed in accordance with my invention.
Figure 2:
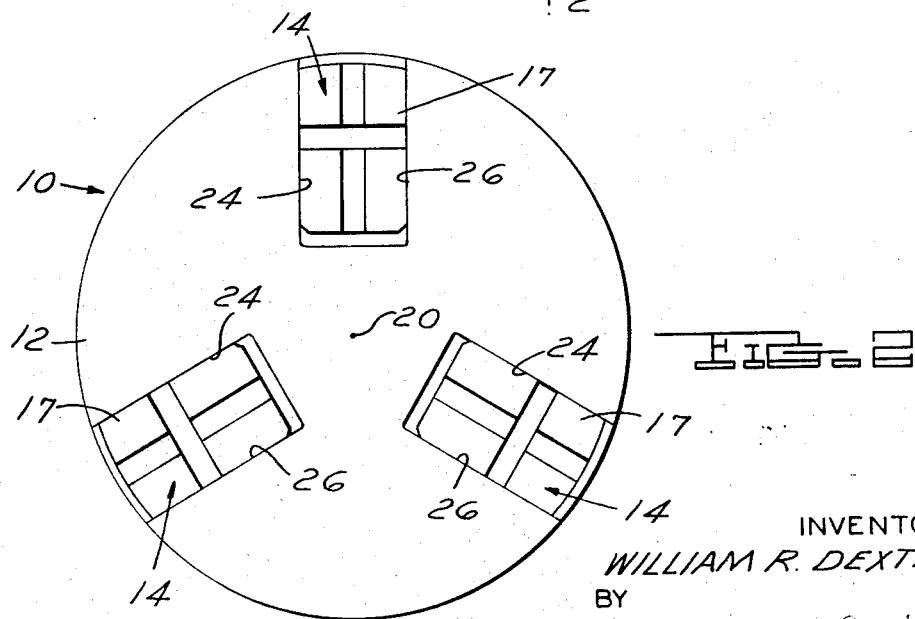
FIG. 2 is a front elevational view of the chuck with the jaw clamping elements removed, taken substantially on the line 2—2 in FIG. 1.

Referring now more particularly to the drawings, the chuck is generally designated 10 and comprises a circular chuck body 12, three jaws 14, and jaw operating mechanism generally designated 16. Each jaw 14 comprises a master jaw member 17 and a clamping element 18.

The chuck body 12 is rotated on its axis 20 by any suitable means. A circular plate 22 is secured to the front face of the chuck body. The jaws 14 are arranged on the chuck body in equally circumferentially spaced relation. The master jaw members 17 are guided for radially inward and outward sliding movement in the radial grooves 24 which open through the front face of the body 12. Plate 22 retains the master jaw members in the grooves 24 and is provided with the equally circumferentially spaced apertures 26 which register with the grooves, enabling the master jaw members to project through the apertures. The clamping elements 18 for gripping the workpiece W are rigidly secured to the front faces of the respective master jaw members 17 by any suitable means. The elements 18 are generally L-shaped, having the abutments 30 for engaging the end of the workpiece and the radially inwardly facing gripping surfaces 32 for engaging the outer surface of the workpiece.

The jaws 14 are of the same construction and therefore only one will be described in detail. As shown in the drawings, each master jaw member 17 has a transverse channel 32 in the rear face extending from one side to the other. Enlarged wedge-receiving recesses 34 are formed in the rear surface of each master jaw member at the ends of and in communication with the channel 32. The bottoms of these recesses 34 are arcuate as indicated at 36, the center of the arc being indicated at 38.

The locking members or wedges 40 are provided for each jaw, one being disposed in each recess 34. As seen clearly in FIG. 3, one end 42 of each wedge is of arcuate form to be received in the arcuate portion 36 of its recess. The wedge is inserted into recess 34 from the open end of the recess before the jaw is assembled with the chuck body, and because the arcuate recess portion 36 extends more than 180° the wedge is securely pivotally retained in the recess.

The swinging ends 44 of the wedges are adapted to wedge upon the forwardly facing surfaces 46 at the bottom of groove 24 when the master jaw 14 tends to move radially outwardly by centrifugal force. This wedging action takes place because the maximum distance from the pivotal center 38 of the wedge 40 to the end surface of the swinging portion 44 of the wedge 40 is greater than the distance from center 38 and the surface 46 of the groove 24 in the chuck body.

Compression coil springs 50 are compressed within sockets 52 in the master jaw member and bear radially inwardly against the swinging ends 44 of the wedges 40, tending to turn the wedges radially inwardly in a wedging direction.

The operating mechanism 16 for moving the jaws 14 radially inwardly and outwardly includes an axially movable push rod 54 concentric with the axis of rotation 20 of the chuck, having an enlarged lever operator 56 secured on the end which extends within the chuck body. This operator 56 is axially slidably received within a bearing 58 in the chuck body. The operator 56 has a circumferential recess 60 for receiving the inner ends of the radial arms 62 of the L-shaped or bell crank clamp levers 64. The generally axially extending arms 66 of the levers 64 have terminal portions 68 extending into the channels 32 of the master jaw members 18. One lever 64 is provided for each jaw. The levers 64 are pivoted for rocking movement within chambers 70 of the chuck body by pivot pins 72. These chambers open into grooves 24 between the surfaces 46 thereof.

Figure 3:
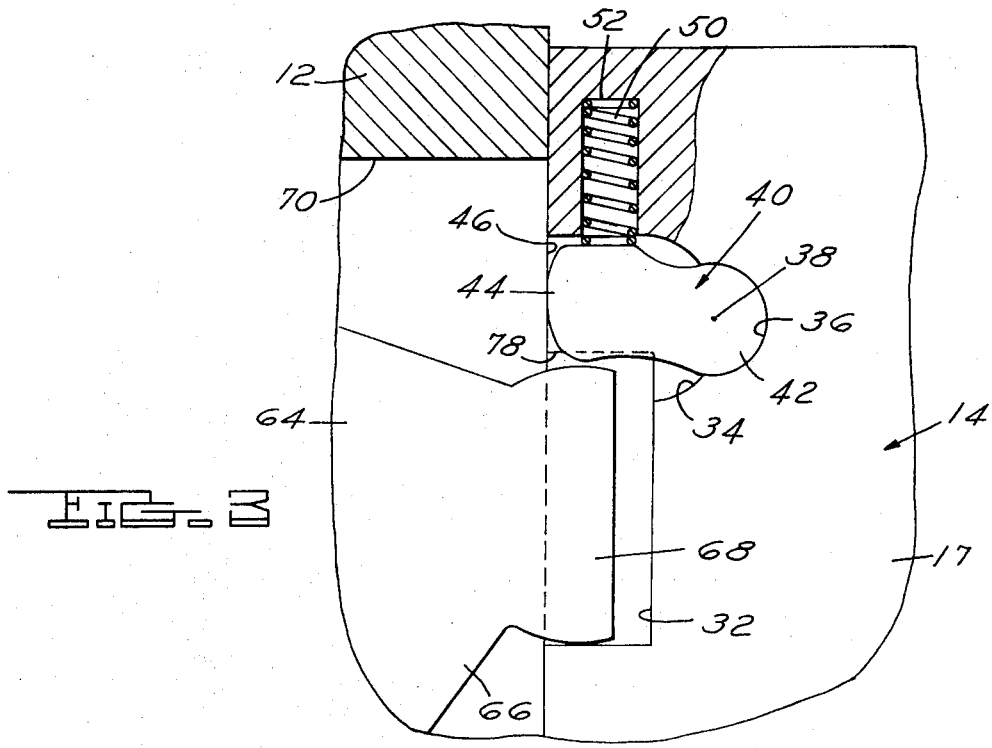
FIG. 3 is an enlarged fragmentary view of a portion of FIG. 1.
Figure 4:
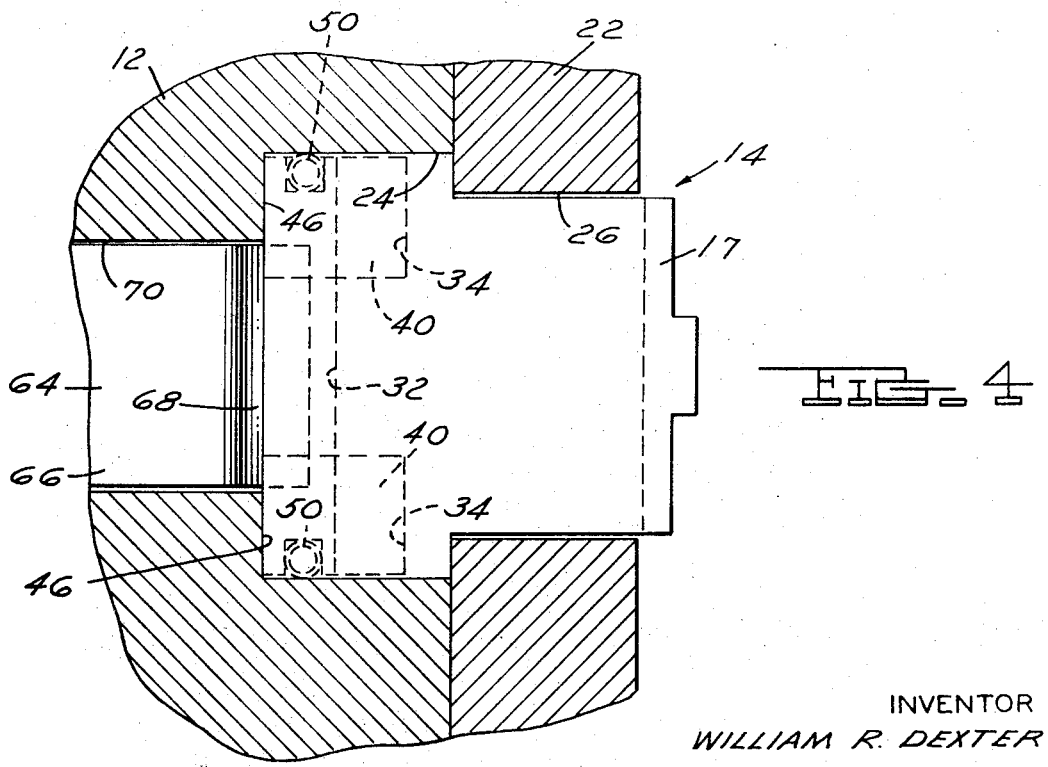
FIG. 4 is a fragmentary sectional view taken substantially on the line 4—4 in FIG. 1, with the jaw clamping element removed.

When pivoted clockwise in FIGS. 1 and 3, each lever 64 urges the associated jaw 14 radially inwardly by contact of its terminal portion 68 with the radially inner side of the channel 32. When pivoted counterclockwise, the terminal portion 68 of the lever 64 will initially engage and turn wedges 40 to release the wedging action, and further counterclockwise movement will retract the jaw radially outwardly. This radially outward movement of the master jaw is effected when the terminal portion 68 of lever 64 contacts the side 78 of channel 32.

In operation, the jaws of the chuck are moved radially inwardly to clamp the workpiece by a movement of the push rod 54 to the left in FIG. 1. Thereafter during the rotation of the chuck, the wedges 40 engage the surfaces 46 of the chuck body to prevent radially outward movement of the jaws in response to centrifugal force. The jaws will retain any inward clamping position to which they are moved, solely by the action of the wedges 40 and without any holding pressure being maintained on the levers 64. Springs 52 constantly press the wedges 40 radially inwardly.

When it is desired to release the work, the push rod is moved to the right in FIG. 1. This first shifts the swinging ends of wedges 40 radially outwardly to release them, and thereafter positively moves the jaws radially outwardly to release the work.

The chuck may also be used to clamp the ID of a workpiece by moving the push rod 54 to the right in FIG. 1 to move the jaws radially outwardly. The jaws are moved radially outwardly in clamping engagement with the ID of the workpiece by engagement of the terminal portions 68 of levers 64 with the sides 78 of channels 32. The wedging action obtained when clamping on the OD of a workpiece to resist centrifugal force is not needed when clamping on the ID.

I claim:

1. In a rotary chuck having a chuck body, circumferentially spaced jaws radially movably mounted on said body to clamp a workpiece upon radially inward movement thereof, each jaw having a laterally extending channel, clamping means including a clamping member for each jaw having a terminal portion extending into the channel thereof, said clamping members being movably mounted on said body so that movement in one direction causes said terminal portions to move said jaws radially inwardly to clamp a workpiece and movement in the opposite direction causes said terminal portions to move said jaws radially outwardly to unclamp a workpiece, said channels being of greater radial extent than said terminal portions to provide slight initial lost-motion lever movement, laterally spaced arcuate recesses adjacent the ends of each channel, a wedge pivotally mounted at one end in each recess, the swinging ends of said wedges contacting said body and wedging thereagainst when said jaws are urged radially outwardly by centrifugal force to prevent such radially outward movement, said wedges when wedging against said body being spaced from the radially inner wall of said channel a distance greater than the radial thickness of said terminal portions of said clamping members, springs mounted on said jaws and bearing against said wedges to urge the latter in a wedging direction, said terminal portions of said levers being operable to engage said wedges to release the same from wedging contact with said body upon initial lost-motion movement of said levers in said opposite direction and being operable upon further movement of said levers in said opposite direction to move said jaws radially outwardly to unclamp the workpiece.

* * * * *